(12) United States Patent
Lemons

(10) Patent No.: US 11,287,670 B1
(45) Date of Patent: Mar. 29, 2022

(54) EYEWEAR RETENTION DEVICE

(71) Applicant: Lorrie Nicole Lemons, Stokesdale, NC (US)

(72) Inventor: Lorrie Nicole Lemons, Stokesdale, NC (US)

( * ) Notice: Subject to any disclaimer, the term of this patent is extended or adjusted under 35 U.S.C. 154(b) by 158 days.

(21) Appl. No.: 16/576,894

(22) Filed: Sep. 20, 2019

Related U.S. Application Data

(60) Provisional application No. 62/815,044, filed on Mar. 7, 2019, provisional application No. 62/769,781, filed on Nov. 20, 2018.

(51) Int. Cl.
*G02C 3/00* (2006.01)

(52) U.S. Cl.
CPC .................. *G02C 3/003* (2013.01)

(58) Field of Classification Search
CPC . G02C 3/00; G02C 3/02; G02C 3/003; A45D 8/20; A45D 8/24; A45D 8/36; A45D 8/14; A45D 8/00; A45D 8/30; A45D 8/12
See application file for complete search history.

(56) References Cited

U.S. PATENT DOCUMENTS

| | | | | |
|---|---|---|---|---|
| 4,761,068 A * | 8/1988 | Star | ........................ | G02C 3/003 351/156 |
| 4,820,036 A | 4/1989 | Seet | .............................. | 351/156 |
| 5,355,185 A | 10/1994 | Lee | .............................. | 351/63 |
| 5,471,258 A | 11/1995 | Hsieh | ............................. | 351/123 |
| 5,593,024 A | 1/1997 | Seiler | ................................. | 206/5 |
| 6,142,623 A | 11/2000 | Jones | .......................... | 351/156 |
| 6,854,845 B1 | 2/2005 | Goldman et al. | ............. | 351/112 |
| 7,172,284 B1 | 2/2007 | Sasaki | ........................... | 251/155 |
| 7,255,436 B2 | 8/2007 | Tracy | ............................ | 351/155 |
| 7,562,977 B1 | 7/2009 | Heaton | ........................ | 251/155 |
| 8,381,359 B1 | 2/2013 | McArdle | ....................... | 24/3.12 |
| 8,523,350 B2 | 9/2013 | Krisik et al. | .................. | 351/156 |
| 2016/0025997 A1 * | 1/2016 | Yribarren | ............. | G02C 3/003 351/156 |
| 2017/0172274 A1 * | 6/2017 | Tsai | ........................ | A45D 8/20 |

FOREIGN PATENT DOCUMENTS

| | | | | |
|---|---|---|---|---|
| CA | 2261502 A1 * | 8/2000 | ............... | A45D 8/02 |
| EP | 0991973 | 2/2004 | ............... | G02C 3/02 |
| JP | 08211338 A * | 8/1996 | ............. | G02C 5/001 |

OTHER PUBLICATIONS

Machine translation of JP 08211338A retrieved electronically from Espacenet, Jun. 25, 2021 (Year: 2021).*

\* cited by examiner

*Primary Examiner* — Cara E Rakowski
(74) *Attorney, Agent, or Firm* — MacCord Mason PLLC

(57) ABSTRACT

Eyewear retention devices, systems, and assemblies are shown and described. The eyewear retention device may comprise a pair of elongated securement points moveably attachable about a temple of an eyewear; a clip body having opposing apertures; and a pair of cords having an insert to removably fit within the opposing apertures. The result is an eyewear retention device to secure eyewear on a head of a user.

18 Claims, 12 Drawing Sheets

EYEWEAR RETENTION DEVICE

This application claims the benefit of U.S. provisional application No. 62/769,781, filed Nov. 20, 2018 and U.S. provisional application No. 62/815,044, filed Mar. 7, 2019, which are incorporated herein by reference in their entireties.

FIELD OF THE TECHNOLOGY

The present inventions relate generally to eyewear and, more particularly, to an eyewear retention device for securing eyewear onto a head of a user.

BACKGROUND

A common issue among eyewear users is the ability to retain the eyewear onto a user's head and prevent its loss. Several solutions include the use of a strap that acts as a necklace for a pair of spectacles, or retrofitting a cap to include a clip for retaining a pair of spectacles. However, these solutions may detract from a user's desired appearance, and in the case of the aforementioned clips, require a user to wear a hat in order to employ the clip. Moreover, none of the currently available solutions enable the eyewear to be retained in windy environmental conditions or at a wave pool or ocean whereby the force of a wave can knock the eyewear off a user's head.

Thus, Applicant desires an eyewear retention device that prevents the eyewear from being dislodged when the device is secured to a user's head, while, at the same time, remaining virtually concealed from others.

SUMMARY

In accordance with the present disclosure, an eyewear retention device is provided for securing eyewear on a head of a user. This disclosure provides an improved device that can retain the eyewear on a user's head even if the eyewear is subjected to environmental forces such as wind or ocean waves, while at the same time, remaining virtually concealed.

In one embodiment, an eyewear retention assembly for securing eyewear on a head of a user includes a pair of clasps secured to a temple of the eyewear; a pair of cords secured to the clasps at one end and having a fixed length; and a hairclip having a first half portion secured to an opposing end of the cord and a second half portion secured to an opposing end of another cord, whereby the eyewear is adapted to be secured onto a head of a user by wrapping the cords around toward the back of the head and fastening the hairclip at the back of the head.

In certain examples, a rubber lining on a projection on the first half portion of the hairclip adapted to be inserted into a recess on a the second half portion of the hairclip defining a watertight seal in a fastened position. The assembly may include including a silicone gripping on a surface of the hairclip adapted to substantially eliminate movement of the hairclip when fastened onto a head of a user. The clasps may include elastic bands wrapped onto the temples of an eyewear. The clasp may include a metal piece having a rubber lining and adapted to be fastened onto the temples of an eyewear.

In one embodiment, an eyewear retention device includes a pair of elongated securement points moveably attachable about a temple of an eyewear; a clip body having an opening adapted to receive a portion of hair to retain the clip body in a semi-fixed position, and a pair of opposing apertures; and a pair of cords extending from the elongated securement points having a distal insert. Typically, the clip body apertures receive and retain the pair of inserts in an assembled position.

In one example, the clip body has an upper portion removable about a lower portion. The upper portion may have a male protrusion and the lower portion having a female adapter, wherein the male protrusion being semi-fixed within the female adapter in an operating position. The clip body may have a distal aperture to receive a first insert, and a proximate aperture to receive a second insert. The distal aperture and the proximate aperture may have a depth that is substantially less than a depth of the corresponding insert, for instance to supply a pressure fit connection.

In certain examples, the clip body comprises a silicone gripping on a surface adapted to substantially eliminate movement of the hairclip when fastened onto a head of a user. The clip body may be a substantially flat hair clip. Further, the pair of elongated securement points include a resilient cylinder. The pair of elongated securement points may include a fastener to secure the cords. The insert may have a projection. Further, the projection may have a snap fastener adapted to mate with the clip body aperture. The device may have an adjustment cord extension about the cord. The device may have an alignment support to secure the adjustment cord extension about the cord in a fixed length position. The cord may be comprised of nylon and may be substantially colorless. Further, the eyewear may be a pair of spectacles.

In another embodiment, an eyewear retention device includes a pair of resilient cylinder securement points moveably attachable about a temple of an eyewear; a clip body with an upper portion removable about a lower portion, and having an opening to receive a portion of hair to retain the clip body in a semi-fixed position, and a pair of opposing apertures; and a pair of cords extending from the elongated securement points and a distal portion having an insert, wherein the insert comprising a snap fastener projection protruding from the insert.

In some examples, the cords include an adjustment cord loop extension. Further, the upper portion may have a male protrusion and the lower portion having a female adapter, wherein the male protrusion being semi-fixed within the female adapter in an operating position. Additionally, the apertures may have a depth substantially less than a depth of the corresponding insert adapted for a pressure fit connection.

Other embodiments include an eyewear retention device comprising a pair of clasps, each clasp attached to a temple of an eyewear; a pair of cords, each cord attached to one of the clasps at one end and having a fixed length; and a clip comprised of a first half attached to an opposing end of one cord and a second half attached to an opposing end of another cord. The first half and second half of the clip may be adapted to fasten together, or may be separately fastened onto a user's hair as individual clips. The eyewear is secured onto a head of a user by wrapping the cords around toward the back of the head and fastening the clip at the back of the head. The eyewear may be a pair of spectacles.

The clip may be a hairclip. In some examples, the clip forms a watertight seal when fastened. For instance, the watertight seal comprises a rubber lining on a projection on a first half of the clip adapted to be inserted into a recess on a second half of the clip. The clip may include a silicone gripping on a surface of the hairclip to substantially eliminate movement of the hairclip when fastened onto a head of a user. In another embodiment, each half is an individual clip forming a watertight seal comprising a rubber lining on a projection that is adapted to be inserted onto a recess on that same half.

The clip may be substantially flat to facilitate its concealment. In some examples, the clip has a depth between about 0.5 millimeters and about 5 millimeters. For instance, the clip may have a depth of about 1 millimeter.

The clasps may be comprised of elastic bands adapted to be wrapped onto the temples of an eyewear. In another example, each clasp may be comprised of a metal piece having a rubber lining and adapted to be fastened onto the temples of an eyewear.

The cord may be substantially colorless to facilitate its concealment. In one example, the cord may be comprised of nylon.

Accordingly, one embodiment of the present disclosure includes an eyewear retention device for securing eyewear on a head of a user comprising a pair of clasps, each clasp attached to a temple of an eyewear; a pair of fishing lines, each fishing line attached to one of the clasps at one end and having a fixed length; and a hairclip comprised of a first half attached to an opposing end of one fishing line and a second half attached to an opposing end of another fishing line, wherein the first half and second half are adapted to fasten together. The eyewear is secured onto a head of a user by wrapping the fishing lines around toward the back of the head and fastening the hairclip within a user's hair at the back of the head. The fishing line may be a monofilament.

In some examples, the fishing line may have a fixed length about 1 inch and about 5 inches. For instance, the fixed length may be about 4 inches.

Another aspect of the present disclosure is directed to an eyewear retention device for securing spectacles on a head of a user comprising a pair of clasps, each clasp comprising an elastic band wrapped onto a temple of a pair of spectacles; a pair of fishing lines, each fishing line attached to one of the clasps at one end and having a fixed length between about 1 inch and about 5 inches; and a hairclip having a silicone gripping on its surface to substantially eliminate movement of the hairclip when fastened onto a head of a user. The hairclip is comprised of a first half attached to an opposing end of one fishing line and a second half attached to an opposing end of another fishing line. The first half includes a projection having a rubber lining and the second half includes a recess adapted to receive the projection, whereby the first half and the second half adapted to fasten together and form a watertight seal. The pair of spectacles is secured onto a head of a user by wrapping the fishing lines around toward the back of the head and fastening the hairclip within a user's hair at the back of the head.

Still another aspect of the present disclosure is directed to an eyewear retention device for securing eyewear on a head of a user comprising a pair of clasps, each clasp attached to a temple of an eyewear; a pair of cords, each cord attached to one of the clasps at one end and having a fixed length; a first clip attached to an opposing end of one cord; and a second clip attached to an opposing end of another cord. The eyewear is secured onto a head of a user by wrapping the cords around toward the back of the head and fastening the first and second clips at the back of the head.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF THE PREFERRED EMBODIMENTS

Figure 1:
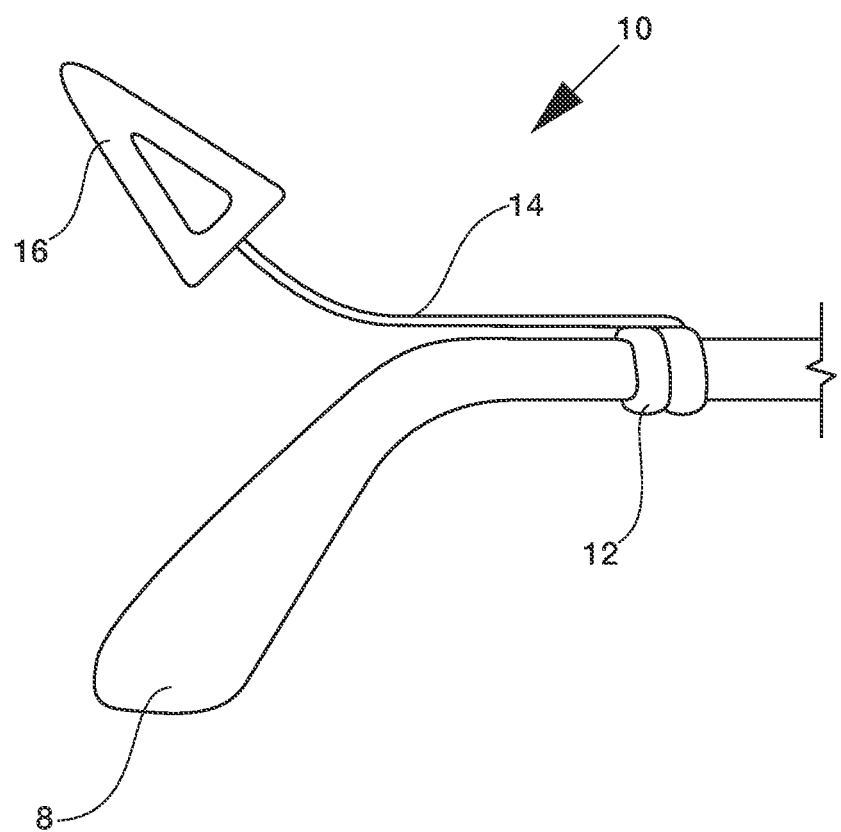
FIG. 1 is an enlarged side perspective view of an eyewear retention device according to one example.

In the following description, like reference characters designate like or corresponding parts throughout the several views. Also in the following description, it is to be understood that such terms as "forward," "rearward," "left,"

"right," "upwardly," "downwardly," and the like are words of convenience and are not to be construed as limiting terms.

Referring now to the drawings in general and FIG. 1 in particular, it will be understood that the illustrations are for the purpose of describing an embodiment of the invention and are not intended to limit the inventions thereto. As seen in FIG. 1, an eyewear retention device, generally designated 10, is shown constructed according to the present inventions. The eyewear retention device 10 is designed for retaining eyewear on a user's head, and comprises a clasp 12, a cord 14, and a clip 16.

Figure 2:
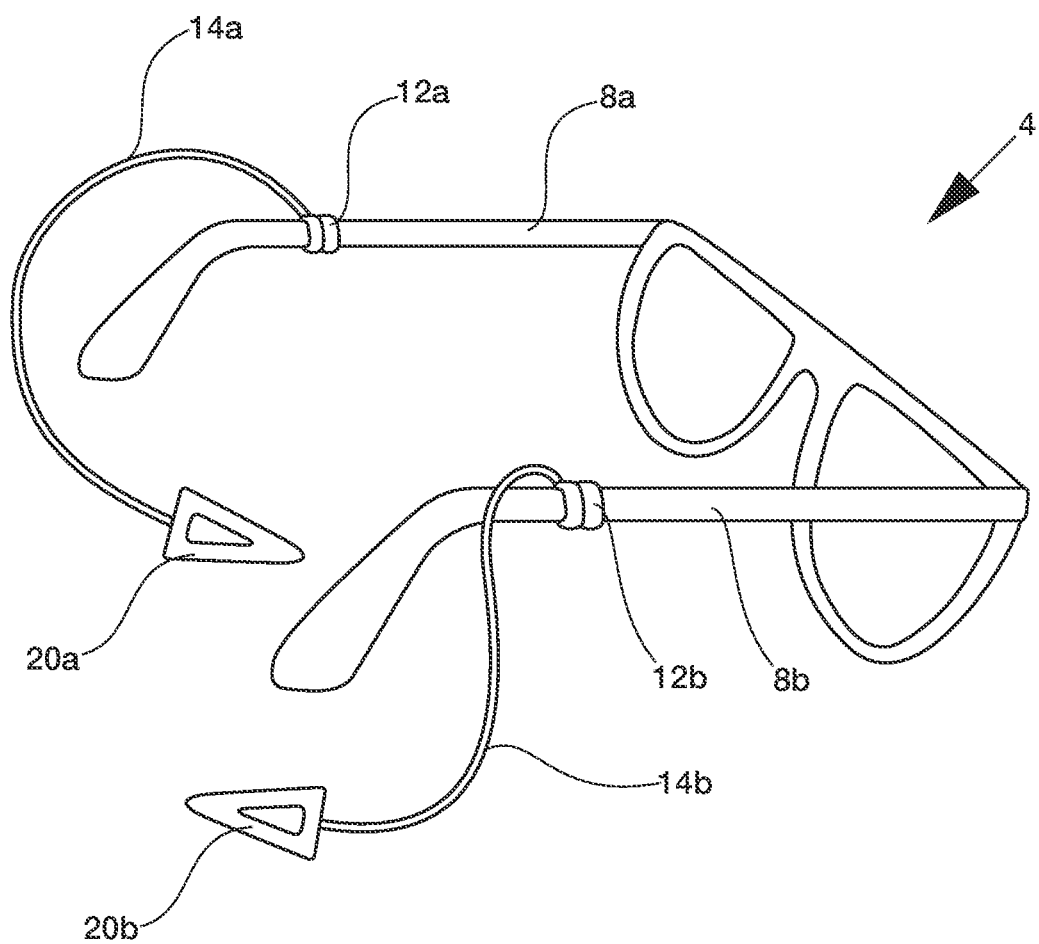
FIG. 2 is a side perspective view of an eyewear retention device installed on a pair of spectacles.

FIG. 2 illustrates one example of an eyewear retention device 10 installed onto a pair of spectacles 4. The pair of spectacles is comprised of lenses and a pair of temples 8a and 8b to be worn on a user's left and right ear, respectively. A pair of clasps 12a, 12b are attached to temples 8a and 8b, respectively, and are used to connect the eyewear retention device 10 to eyewear. Each clasp 12 is connected to a cord 14 having a fixed length. At the other end of the cord 12 is a clip 16 to secure the eyewear onto a user's head. In the example shown in FIG. 2, the clip 16 is comprised of a first half 20a and a second half 20b that are adapted to be fastened together to secure the pair of spectacles 4 onto a user's head. Each half 20a and 20b is attached to a substantially distal end of cords 14a and 14b. The proximal ends of cords 14a and 14b are attached to clasps 12 and 12b, respectively.

Preferably, the cord 14 is substantially fixed in its length to help maintain the eyewear on a user's head. A cord having too much flexibility may cause the eyewear to fall off the user's head if the eyewear 4 or eyewear retention device 10 is subjected to a sufficient force. Having a substantially fixed length cord 14 enables the cord 14 to remain taut when the clip 16 is fastened and the eyewear retention device 10 is in use. In some examples, the length of each cord 14a and 14b is between about 1 inch and about 5 inches. For instance, the length of the cord 14 may be about 4 inches. An alternative embodiment may employ a flexible cord wherein the length is sufficiently short such that the total length of each flexible cord is equal to about 1 inch and about 5 inches when stretched along its length.

In certain examples, the cord 14 may be comprised of a synthetic fiber. For instance, the cord 14 may be comprised of nylon. The cord 14 may be comprised of a monofilament, or in other examples, may be comprised of multiple filaments. Preferably the cord 14 is substantially colorless to conceal its presence when the eyewear retention device 10 is worn. In a preferred embodiment, the cord 14 is a fishing line.

Figure 3:
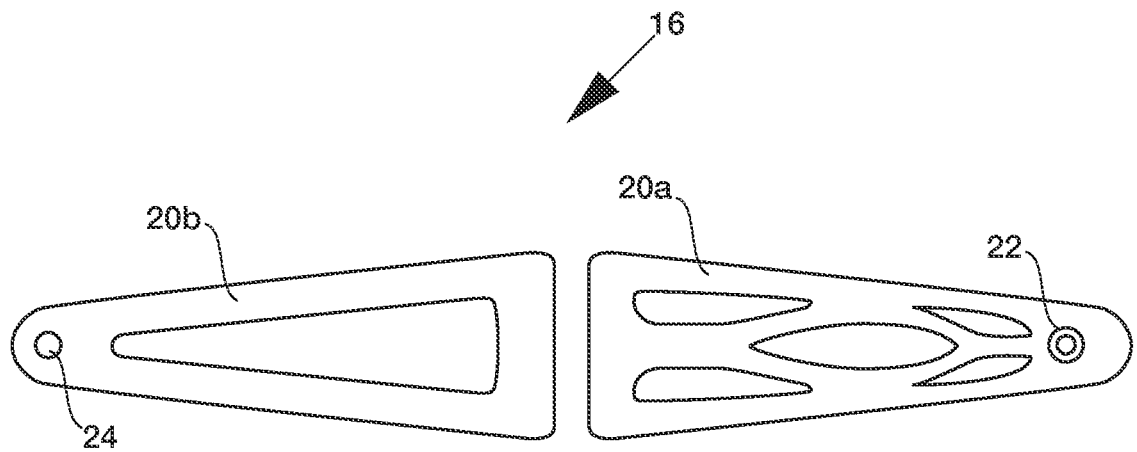
FIG. 3 is a top elevational view of a first half and a second half of a clip according to one example.
Figure 4:
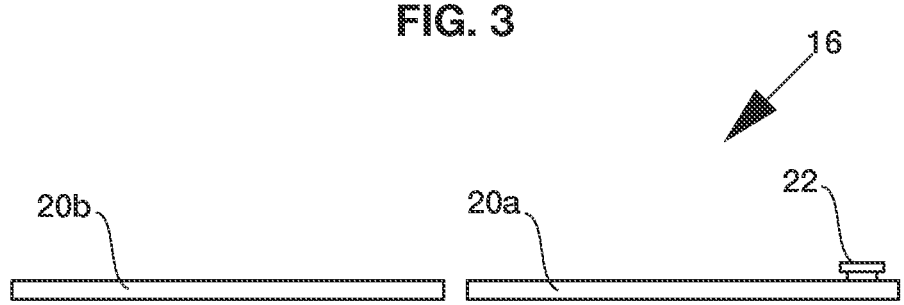
FIG. 4 is a front elevational view of the clip shown in FIG. 3.
Figure 5:
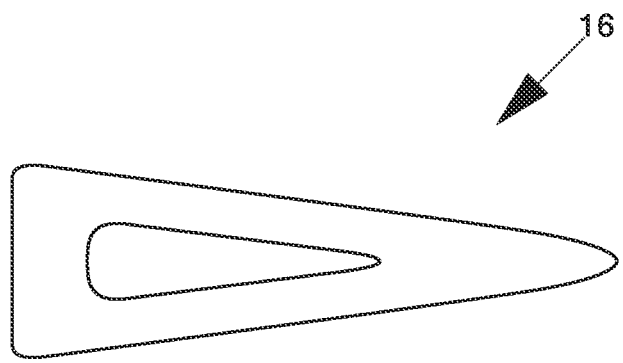
FIG. 5 is a top elevational view of the clip shown in FIG. 3 wherein the first half and second half are fastened together.

Turning to FIGS. 3-5, the clip 16 may be a hairclip comprised of a first half 20a and a second half 20b. Each half is adapted to be attached to a free end of a cord 14. As seen in FIG. 5, the first half 20a and second half 20b are adapted to attached together in order to secure eyewear onto a user's head. In the example shown in FIGS. 3 and 4, the first half 20a includes a projection 22 and the second half 20b includes a recess 24. The projection 22 is adapted to be inserted into the recess 24 in order to fasten the clip 16.

In some examples, the projection 22 may be lined with rubber in order to create a watertight seal. A watertight seal may be useful in scenarios where a user is an aqueous environment, such as a pool or ocean, to prevent water from loosening the clip 16. The first half 20a and second half 20b may comprise individual units. However, in other embodiments, the first half 20a and second half 20b may be joined together at a center even when the clip 16 is unfastened.

Figure 6:
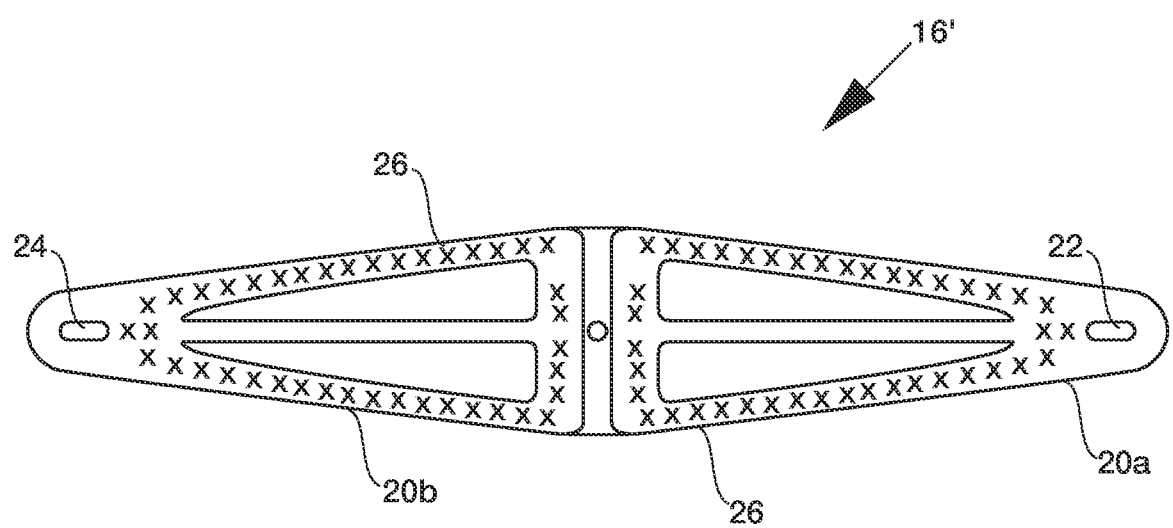
FIG. 6 is a top elevational view of a first half and a second half of a clip according to another example.

FIG. 6 illustrates an alternative embodiment of a clip 16', wherein the first half 20a and second half 20b each include a coating 26 on its surface to substantially eliminate movement of the clip 16 when fastened onto a head of a user. The coating may be a smooth coating or a textured surface. For example, the coating 26 may comprise a silicone gripping.

Figure 15:
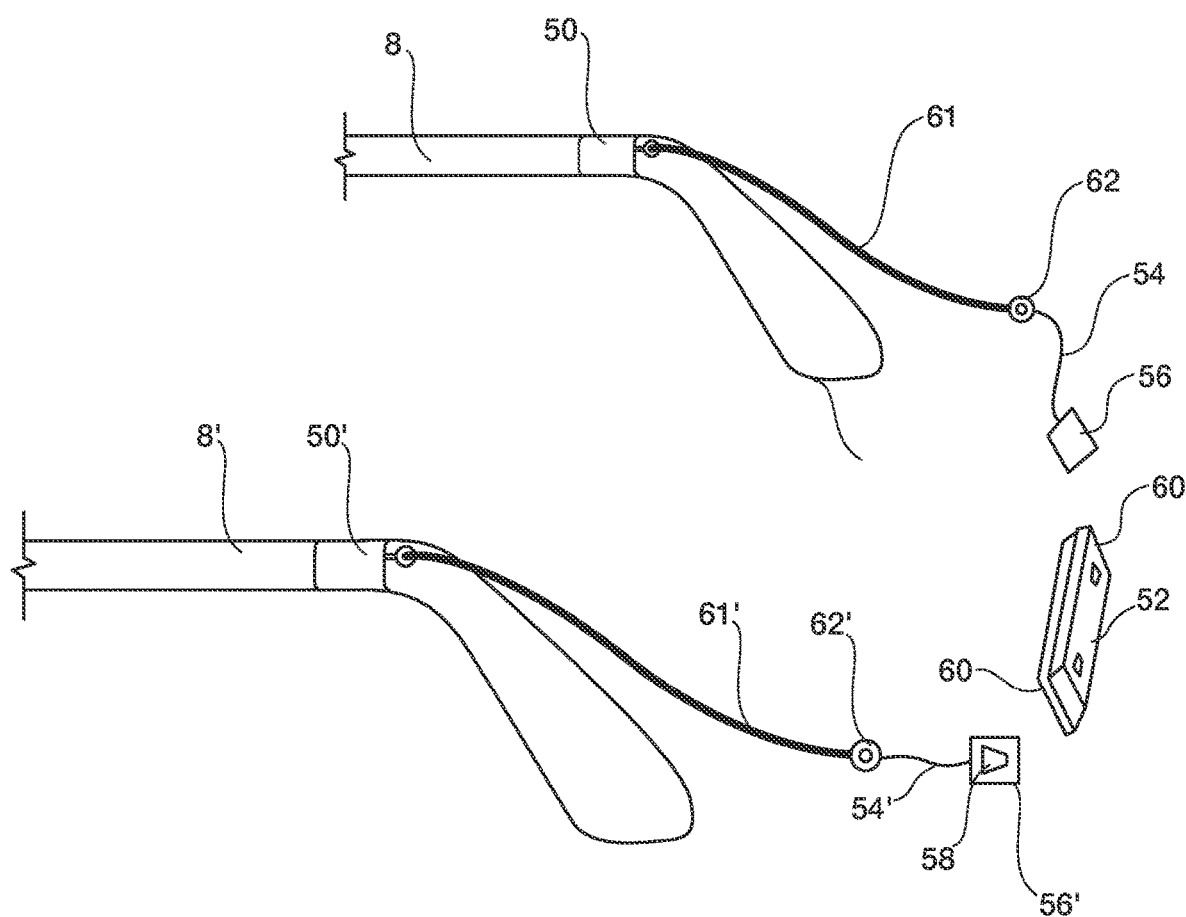
FIG. 15 is a partially-exploded, side perspective view of an eyewear retention device according to one example.

Preferably, the clip 16 is substantially flat to reduce the overall appearance of the eyewear retention device and aid in its concealment. In some examples, the clip 16 has a depth between about 0.5 millimeters and about 5 millimeters. For instance, the clip 16 may have a depth of about 1 millimeter. FIG. 15 discloses another embodiment of a clip 16.

Figure 7:
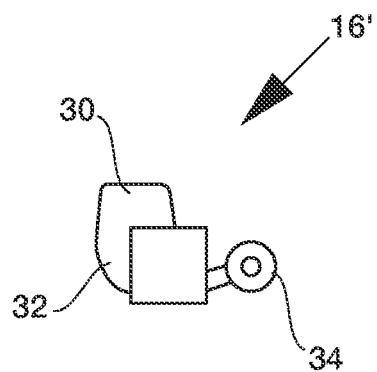
FIG. 7 is a side perspective view of a clasp according to one example.
Figure 8:
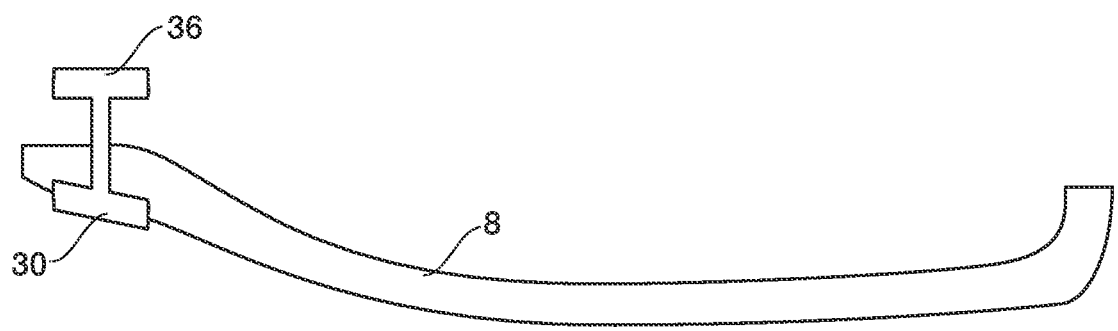
FIG. 8 is a side elevational view of the clasp shown in FIG. 7 installed on a temple.

One example of a clasp 12' is presented in FIG. 7. The clasp 12' may comprise a metal or plastic piece 30 having a rubber lining 32. An attachment point 34 may be used to connect a cord 14 to the clasp 12'. As seen in FIG. 8, the clasp 12' can be mounted onto a temple 8 with a fastener 36.

Figure 9:
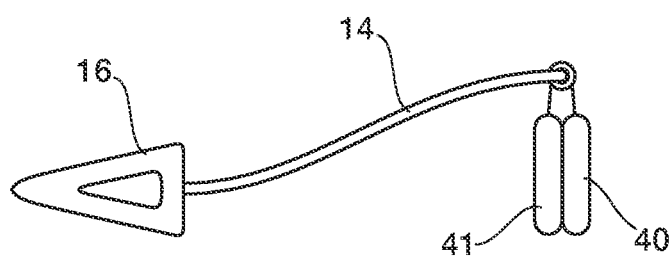
FIG. 9 is a side perspective view of an eyewear retention device according to one example.
Figure 10:
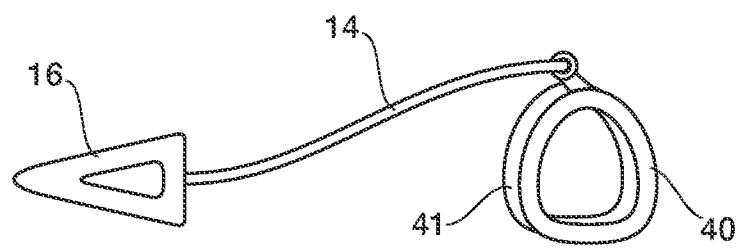
FIG. 10 is a side perspective view of an eyewear retention device of FIG. 9.
Figure 11:
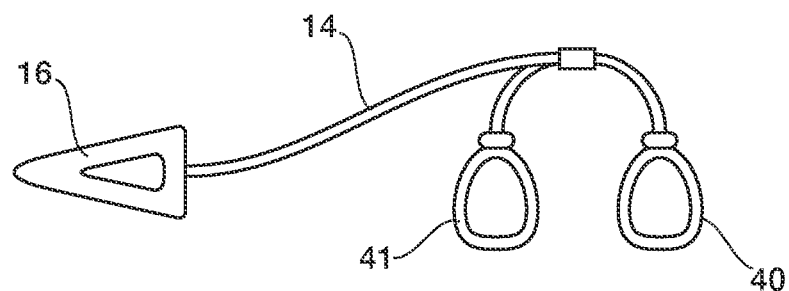
FIG. 11 is a side perspective view of an eyewear retention device according to another example.

FIGS. 9-11 illustrate another example of a clasp comprising a first elastic loop 40 and a second elastic loop 41. Each elastic loop is adapted to securely fit onto a temple on a pair of eyewear. As seen in FIG. 11, the elastic loops may be formed from a single elastic band 42 wherein the first elastic loop 40 and the second elastic loop 41 are found on opposing ends of the elastic band 42.

Figure 12:
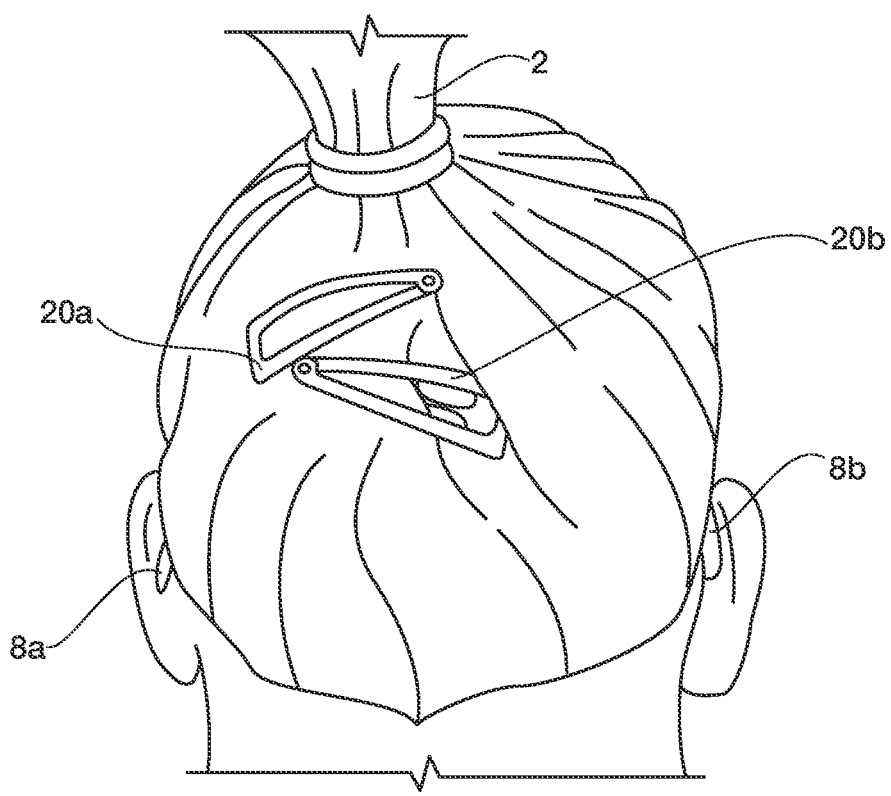
FIG. 12 is a rear perspective view of an individual using an eyewear retention device with the hair up.
Figure 13:
FIG. 13 is a rear perspective view of an individual using an eyewear retention device with the hair down to further conceal the clip.
Figure 14A:
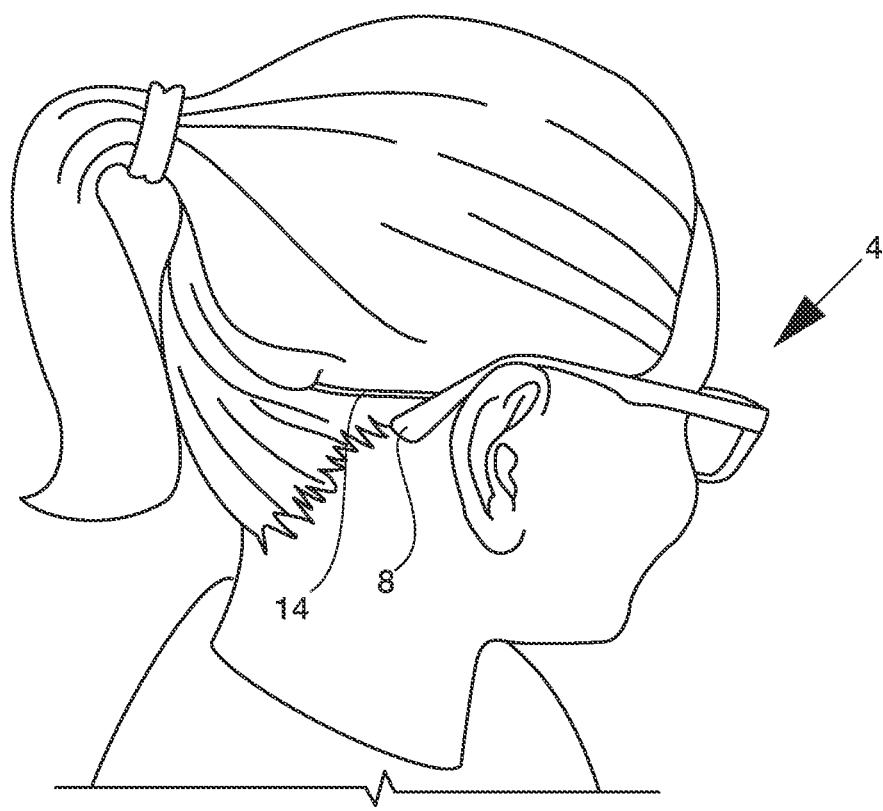
FIG. 14A is a side perspective view of an individual wearing a pair of glasses retained by an eyewear retention device according to one example.
Figure 14B:
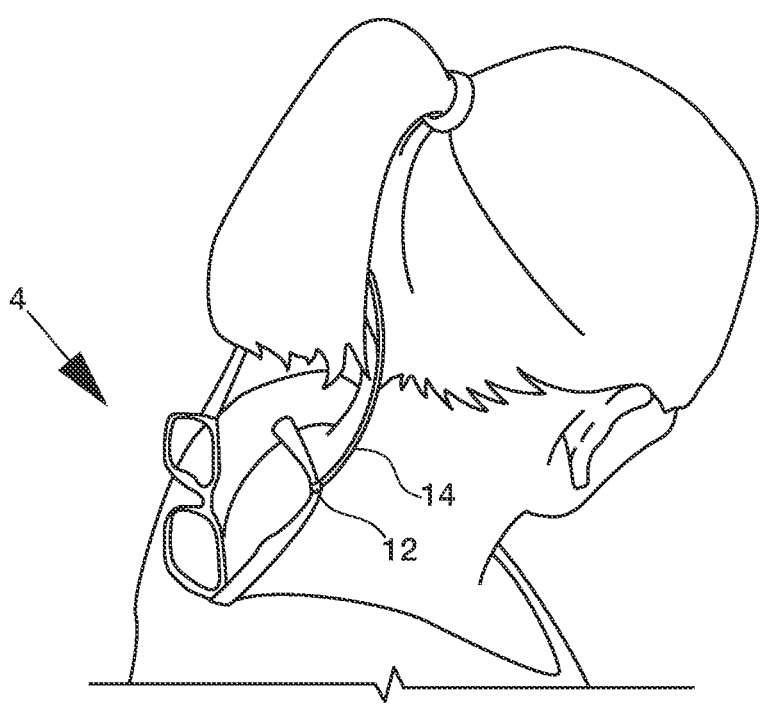
FIG. 14B is a side perspective view of the pair of glasses being retained by the eyewear retention device shown in FIG. 14A.

FIGS. 12-14 demonstrate another embodiment of the eyewear retention device in operation, whereby the eyewear retention device may be secured onto the temples of an eyewear by attaching a first clasp on a first temple and a second clasp on a second temple. Each clasp is attached to a cord having a clip portion at the other end. Once the clasps are attached to the temples of the eyewear, the user wraps the cords around toward the back of the head. A clip portions found on each cord are then fastened together to secure the eyewear onto the user's head. The eyewear can be removed by the user by simply unfastening the clip. While fastened, the clip prevent the eyewear from being completely dislodged from a user's head. FIG. 12 depicts the eyewear retention device exposed to show how the various elements are connected together and worn. FIG. 13 shows the eyewear retention device in operation and concealed by a user's hair 2. FIGS. 14A and 14B show how the eyewear retention device operates to retain a pair of glasses when a force attempts to eject the eyewear off the user's head.

Figure 19:
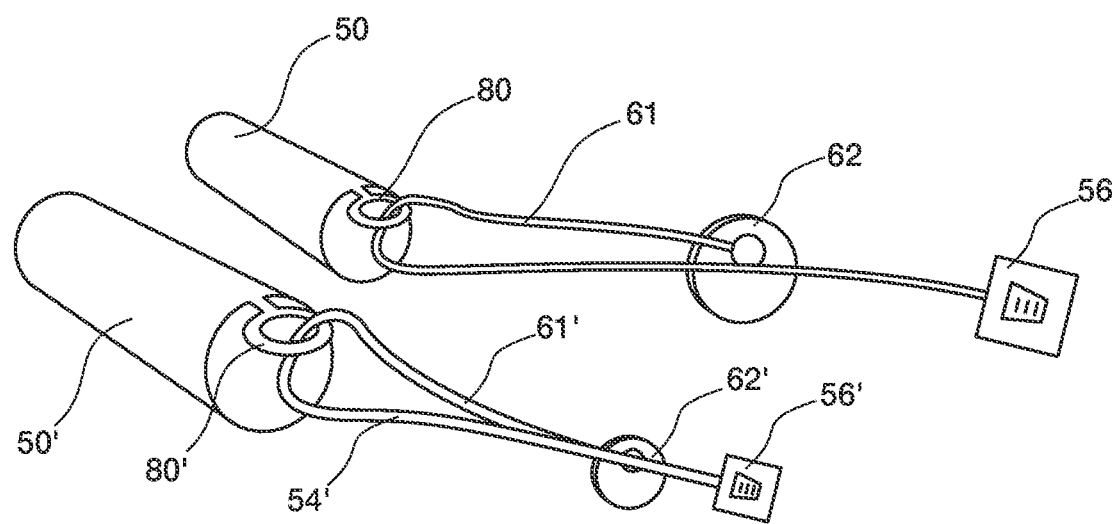
FIG. 19 is a top perspective view of isolated elements introduced in FIG. 15, with elements removed for clarity.

FIGS. 15 and 19 introduce one embodiment of the eyewear retention device for securing eyewear on a head of a user having pair of elongated securement points 50, 50' that are generally moveably attachable about temple 8, 8' of the eyewear. The elongated securement points 50, 50' may be resilient cylinders, for instance thick rubber elements, to slide over portions of the eyewear for personal preference positioning. Two elongated securement points 50, 50' are illustrated, however those skilled in the art having the benefit of this disclosure will recognize a single point contact and the like. As shown in FIG. 19, the elongated securement points 50, 50' may include a fastener 80, 80' to secure any of the cords shown and described herein, including but not limited to mechanical loops, structures, as well as adhesives, bonds, and the like. The pair of cords 54, 54', as well as adjustment cords 60, 60', may extend from elongated securement points elongated securement points 50, 50' in a variety of fashions, and may be any of the cord examples and embodiment shown and described herein. Further, the adjustment cords 61, 61' may be secured at alignment support 62, 62' fastener to secure the cords 54, 54' and/or adjustment cord extension 61, 61' in a fixed length position for personal preference. As further illustrated, the distal end of cords 54, 54' include inserts 56, 56' to mate with corresponding apertures 60 in the clip body 52.

Figure 16A:
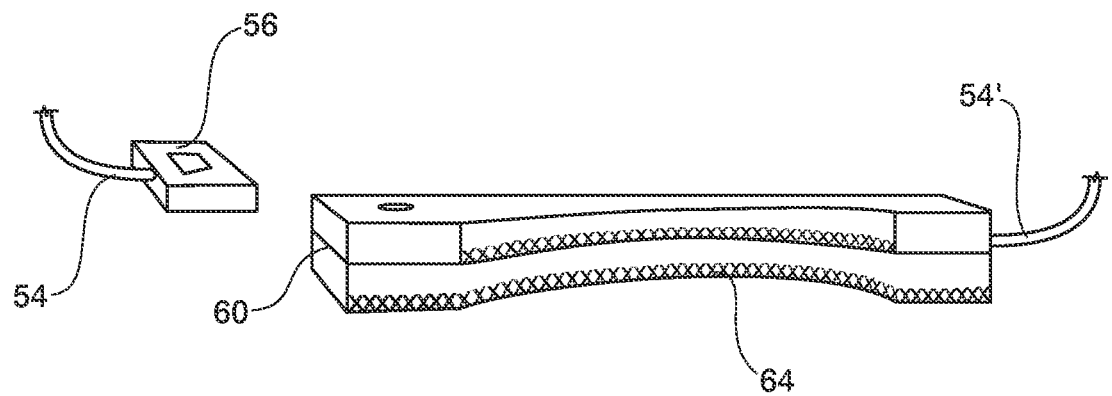
FIG. 16a is a partially-exploded, side perspective view of isolated elements introduced in FIG. 15, with elements removed for clarity.
Figure 16B:
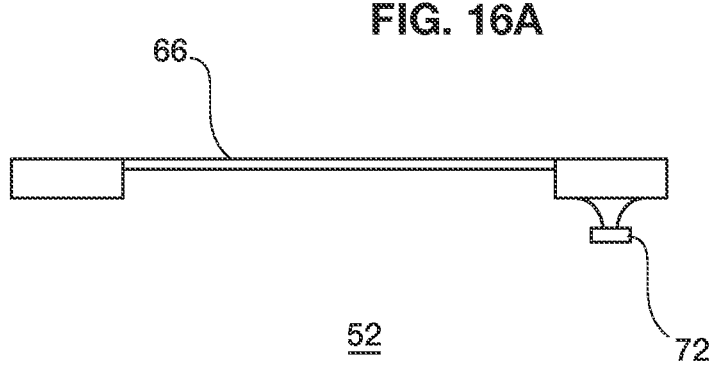
FIG. 16b is a partially-exploded, side perspective view of isolated elements introduced in FIG. 15, with elements removed for clarity.
Figure 16B:
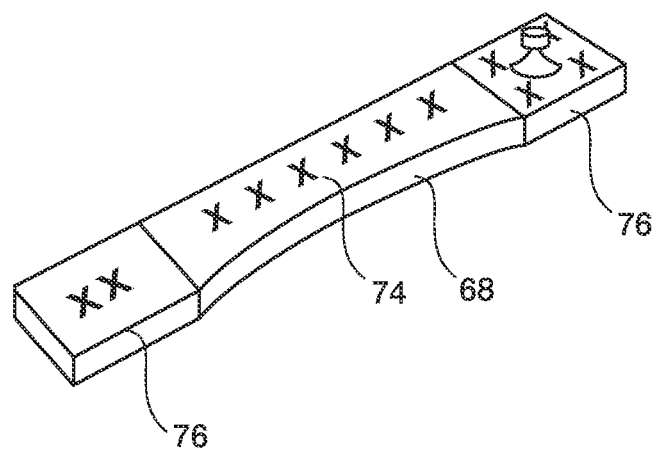

As show in FIGS. 16a and 16b, the clip body 52 may have an upper portion 66 that is generally removable, or at least partially removable, about a lower portion 68. The lower portion 68 may have a sunken indent 68 to receive and retain a user's hair, and in particular spaced between opposing raised portions 76, 76' or the like. As shown in FIG. 16b the upper portion 66 may have a male protrusion 72, or similar fastener, and the lower portion 68 may have a female adapter 70, or similar receiving mechanism, wherein male protrusion 72 is semi-fixed within female adapter 70 in any of the operating positions shown and described herein.

Figure 17:
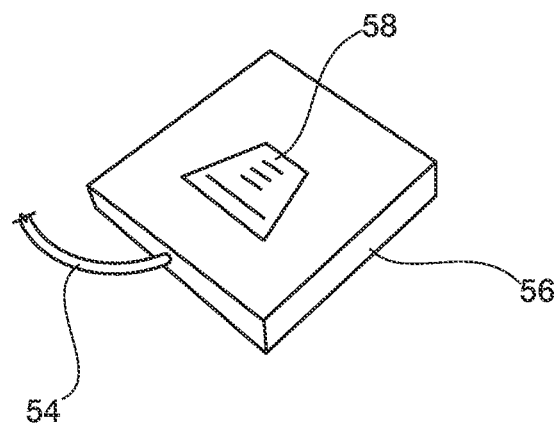
FIG. 17 is a top perspective view of isolated elements introduced in FIG. 15, with elements removed for clarity.

FIG. 17 illustrates one embodiment of an insert 56 having a projection 58 protruding from the upper surface. The projection 58 may include any type of fastener, including, but not limited to, a snap fastener to mate with clip body aperture 60. In particular examples, the distal aperture and proximate aperture may have a depth that is generally less than a depth of the corresponding insert to create a pressure fit, i.e. snap between mechanical elements or similar, connection.

Figure 18:
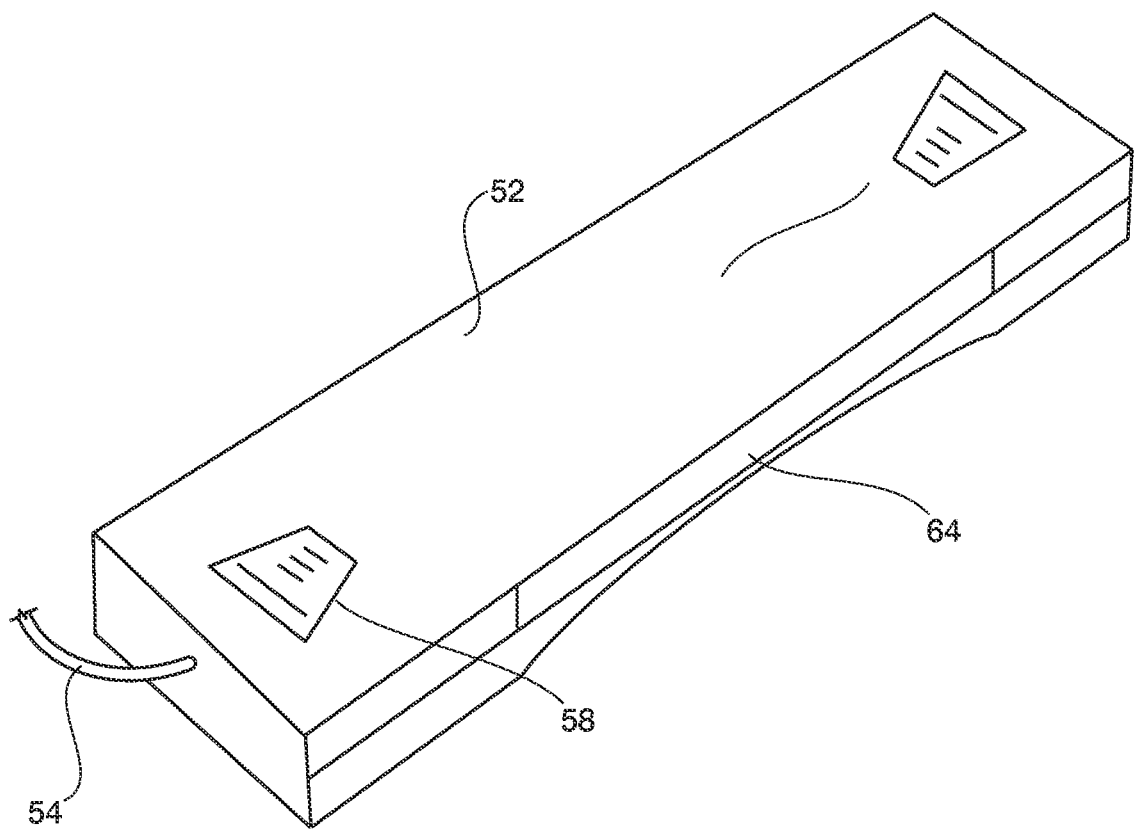
FIG. 18 is a top perspective view of isolated elements introduced in FIG. 15, with elements removed for clarity.
Figure 20:
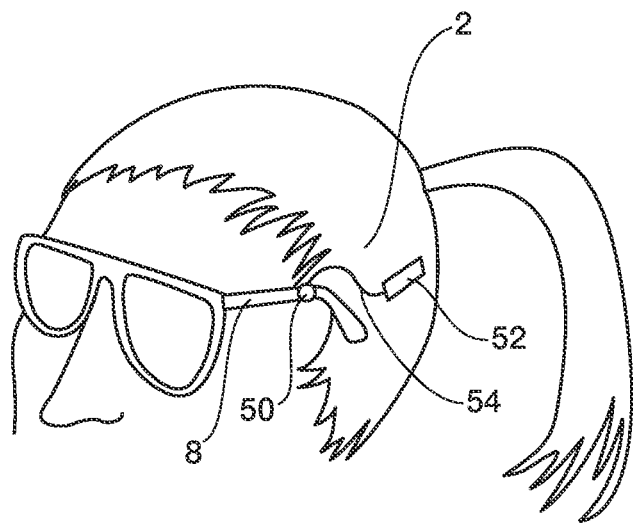
FIG. 20 is a side perspective view of an individual wearing a pair of glasses retained by an eyewear retention device according to one example.

FIG. 18 illustrates an assembled position, wherein the clip body aperture receives and retains inserts in an assembled position. FIG. 20 illustrates one example of the eyewear retention device in operation, and in certain embodiments concealed by a user's hair 2. Those skilled in the art having the benefit of this disclosure will recognize additional arrangements and operation positions.

Certain modifications and improvements will occur to those skilled in the art upon a reading of the foregoing description. By way of example, the clip may be a clip other than hairclip (i.e., a clip that does not need to be clipped with a user's hair). It should be understood that all such modifications and improvements have been deleted herein for the sake of conciseness and readability but are properly within the scope of the following claims.

What is claimed is:

1. An eyewear retention assembly for securing eyewear on a head of a user comprising:
   (a) a pair of elastic band clasps wrapped onto a temple of said eyewear;
   (b) a pair of cords secured to said clasps at one end and having a fixed length; and
   (c) a hairclip having a first half portion secured to an opposing end of said cord and a second half portion secured to an opposing end of another cord, and
   whereby said eyewear is adapted to be secured onto a head of a user by wrapping said cords around toward the back of the head and fastening said hairclip at the back of the head.

2. The eyewear retention assembly of claim 1, including a rubber lining on a projection on said first half portion of said hairclip adapted to be inserted into a recess on a said second half portion of said hairclip defining a watertight seal in a fastened position.

3. The eyewear retention assembly of claim 1, including a silicone gripping on a surface of said hairclip adapted to substantially eliminate movement of said hairclip when fastened onto a head of a user.

4. The eyewear retention assembly of claim 1, wherein each clasp is comprised of a metal piece having a rubber lining and adapted to be fastened onto the temples of an eyewear.

5. An eyewear retention device for securing eyewear on a head of a user comprising:
   a. a pair of elongated securement points moveably attached about a temple of an eyewear;
   b. a clip body having an opening adapted to receive a portion of hair to retain said clip body in a semi-fixed position, and a distal aperture adapted to receive a first insert and a proximate aperture adapted to receive a second insert; and
   c. a pair of cords extending from said elongated securement points having a distal insert, and
   wherein said clip body apertures receive and retain said pair of distal inserts in an assembled position.

6. The eyewear retention device of claim 5, wherein said clip body having an upper portion removable about a lower portion.

7. The eyewear retention device of claim 6, wherein said upper portion having a male protrusion and said lower portion having a female adapter, wherein said male protrusion being semi-fixed within said female adapter in an operating position.

8. The eyewear retention device of claim 5, wherein said distal aperture and said proximate aperture having a depth substantially less than a depth of said corresponding insert adapted for a pressure fit connection.

9. The eyewear retention device of claim 5, wherein said clip body comprising a silicone gripping on a surface adapted to substantially eliminate movement of said hairclip when fastened onto a head of a user.

10. The eyewear retention device of claim 5, wherein said clip body being a substantially flat hair clip.

11. The eyewear retention device of claim 5, wherein said pair of elongated securement points include a resilient cylinder and a fastener to secure said cords.

12. The eyewear retention device of claim 5, wherein said insert includes a projection and a snap fastener adapted to mate with said clip body aperture.

13. The eyewear retention device of claim 5, further including an adjustment cord extension about said cord.

14. The eyewear retention device of claim 13, including an alignment support adapted to secure said adjustment cord extension about said cord in a fixed length position.

15. An eyewear retention device comprising:
   a. a pair of resilient cylinder securement points moveably attachable about a temple of an eyewear;
   b. a clip body with an upper portion removable about a lower portion, and having an opening adapted to receive a portion of hair to retain said clip body in a semi-fixed position, and a pair of opposing apertures; and
   c. a pair of cords extending from said resilient cylinder securement points and a distal portion having an insert, wherein said insert comprises a snap fastener projection protruding from said insert.

16. The eyewear retention device of claim 15, wherein said cords include an adjustment cord loop extension.

17. The eyewear retention device of claim 15, wherein said upper portion having a male protrusion and said lower portion having a female adapter, wherein said male protrusion being semi-fixed within said female adapter in an operating position.

18. The eyewear retention device of claim 15, wherein said apertures having a depth substantially less than a depth of said corresponding insert adapted for a pressure fit connection.

* * * * *